(12) United States Patent
Mizuno et al.

(10) Patent No.: US 6,386,853 B1
(45) Date of Patent: May 14, 2002

(54) MOTOR-DRIVEN INJECTION DRIVING APPARATUS FOR AN INJECTION MOLDING MACHINE

(75) Inventors: Takashi Mizuno; Takeshi Ishiwada; Junji Murase, all of Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/555,916

(22) PCT Filed: Oct. 5, 1999

(86) PCT No.: PCT/JP99/05468

§ 371 Date: Jun. 6, 2000

§ 102(e) Date: Jun. 6, 2000

(87) PCT Pub. No.: WO00/20187

PCT Pub. Date: Apr. 13, 2000

(30) Foreign Application Priority Data

Oct. 6, 1998 (JP) .......................................... 10-283665

(51) Int. Cl.[7] .............................................. B29C 45/80
(52) U.S. Cl. ...................................... 425/145; 425/150
(58) Field of Search ................................ 425/145, 149, 425/150

(56) References Cited

U.S. PATENT DOCUMENTS 5,129,808 A   7/1992   Watanabe et al.

FOREIGN PATENT DOCUMENTS

| EP | 0 427 866 A1 | 5/1991 |
|----|--------------|--------|
| JP | 61237615 A | 10/1986 |
| JP | 61244520 A | 10/1986 |
| JP | 62278017 A | 12/1987 |
| JP | 63077722 A | 4/1988 |
| JP | 5-53923 | 7/1993 |

*Primary Examiner*—Tim Heitbrink
(74) *Attorney, Agent, or Firm*—Alston & Bird, LLP (57) ABSTRACT

A motor-driven injection driving apparatus for an injection molding machine comprises a fixed frame 4 having an injection cylinder 8, first and second injection drive motors 7, and first and second ball screw shafts 10; first and second power transmission mechanisms 12 for transmitting the rotational forces of the first and second injection drive motors 7 to the first and second ball screw shafts 10, respectively, while reducing the speed; and a movable frame 6 provided with first and second ball screw nuts 11 threaded on the first and second ball screw shafts 10, respectively, and a screw drive motor 14 and capable of being moved in the direction of injection together with an injection screw 9. In the injection process, the movable frame 6 is moved so that a tensile force acts on the first and second ball screw shafts 10.

5 Claims, 6 Drawing Sheets

MOTOR-DRIVEN INJECTION DRIVING APPARATUS FOR AN INJECTION MOLDING MACHINE

TECHNICAL FIELD

The present invention relates to a motor-driven injection driving apparatus for an injection molding machine, in which a driving portion is made small in size by means of synchronous driving using a plurality of motors to enhance the arrangement balance of driving force and functional parts.

BACKGROUND ART

A conventional motor-driven injection driving apparatus for an injection molding machine is provided with one or two drive motors. For the injection driving apparatus provided with one drive motor, two pairs of screws and nuts are used to convert the rotational motion of the motor into linear motion, and these pairs are arranged at symmetrical positions on both sides of an injection screw. The power is transmitted by a toothed transmission belt or a gear train (refer to an injection apparatus for an injection molding machine disclosed in Japanese Patent Publication No. 8-9184 (No. 9184/1996), for example).

On the other hand, Japanese Patent Publication No. 3-41050 (No.41050/1991) has disclosed an injections crew driving apparatus in which the driving force is distributed so that a standard motor can be used. In this driving apparatus, individual driving servomotors are connected directly to screw shafts for linear driving provided on both sides of an injection screw.

In the aforementioned motor-driven injection driving apparatus, in order to avoid an overload of motor, protecting means must be taken: for example, a resin pressure is measured at the time of injection, and if the resin pressure exceeds the standard value, the injection speed is reduced. For the protecting means disclosed in Japanese Patent Provisional Publication No. 62-218118 (No. 218118/1987), a strain gage is provided at the connecting portion between driving means for driving a screw for an injection molding machine in the axial direction and the screw, and a pressure applied to a resin in a mold is detected by this strain gage.

The injection molding machine of a medium or larger size requires a very high pressure for injection. Therefore, when a conventional injection driving apparatus using one motor is applied to the injection molding machine of a medium or larger size, a motor of special specifications is needed to deliver a high torque, so that the cost increases, and also the arrangement balance becomes bad when the apparatus is mounted on the injection molding machine.

On the other hand, for the injection driving apparatus using two injection drive motors, the rotation of motor is kept low, so that the output of motor is also kept low. Therefore, in order to provide a necessary injection pressure, a large motor is used, which leads to the increase in cost and weight.

Also, in the arrangement of screw shaft in the injection driving apparatus disclosed in Japanese Patent Publication No. 3-41050 (No.41050/1991), a compressive force acts on the screwshaft from the nut side in the injection process. Therefore, to stably support the screw shaft, a bearing is provided to support the end portion of the screw shaft. Nevertheless, the screw shaft is pushed and bent, so that buckling may occur. Also, there arises a problem in that if a bearing is provided at the end portion of the screw shaft, the overall length of the injection apparatus increases.

The present invention has been made to solve the above problems with the prior arts, and accordingly an object thereof is to provide a motor-driven injection driving apparatus for an injection molding machine, in which a small standard motor is used as an injection drive motor to decrease the cost, and the apparatus can be mounted on the injection molding motor with a good balance.

Also, another object of the present invention is to provide a motor-driven injection driving apparatus for an injection molding machine, in which inexpensive pressure detecting means of an ordinary size can be used, the performance of the pressure detecting means can be maintained for a long period of time, and the injection pressure in the injection and dwell process can easily be controlled with a closed loop.

DISCLOSURE OF THE INVENTION

The present invention provides a motor-driven injection driving apparatus for an injection molding machine, which is configured so that the rotation of an electric motor is converted into linear motion, and an injection screw is moved forward and rearward by the linear motion, comprising: a fixed frame provided with an injection cylinder in which the injection screw is fitted so as to be moved forward and rearward; first and second injection drive motors installed on the fixed frame; first and second ball screw shafts pivotally supported on both sides of the fixed frame so as to be in parallel and symmetrical with respect to the axis of the injection cylinder and so as to be rotatable; first and second power transmission mechanisms for transmitting the rotational forces of the first and second injection driving motors to the first and second ball screw shafts, respectively, while reducing the speed; a movable frame which is provided, on both sides, with first and second ball screw nuts threaded on ball threads of the first and second ball screw shafts, respectively, and is capable of being moved in the direction of injection together with the injection screw; a screw drive motor, which is mounted on the movable frame, for rotatively driving the injection screw; and a controller for synchronously rotating the first and second injection drive motors, in which the movable frame is moved so that a tensile force acts on the first and second ball screw shafts in an injection process.

Therefore, since the rotational speed of the injection drive motor is increased by means of the speed reduction operation of the power transmission mechanism, whereby the output efficiency of the motor can be enhanced, a small standard motor can be used as the injection drive motor to decrease the cost. Also, the arrangement balance is improved when the apparatus is mounted on the injection molding machine.

Further, since a large force necessary in the injection process acts on the first and second ball screw shafts as a tensile force, there is no fear of deflecting the first and second ball screw shafts. Moreover, since the actuating force in the return direction of the movable frame is far smaller than the actuating force at the time of injection, the ball screw shafts can be moved stably without supporting one end of each of the ball screw shafts by a bearing. As a result, the cost can be decreased and the construction can be simplified.

Also, in the present invention, first and second intermediate bearing frames are provided on one side and on other side of the fixed frame, and the power transmission mechanism includes an intermediate transmission shaft pivotally supported on the Intermediate bearing frame so as to be rotatable and winding transmission means for transmitting power from the injection drive motor to the ball screw shaft through the intermediate transmission shaft while reducing the speed.

Therefore, the rotation of the injection drive motor is transmitted to the ball screw shafts by the power transmission mechanism while the speed is reduced at two stages. As a result, the rotational speed of the motor can be increased, whereby the output efficiency of the motor can further be enhanced.

Further, in the present invention, the power transmission mechanism includes a planetary reduction gear connected directly to the injection drive motor, a small pulley for transmission belt, which is fixed to an output shaft of the planetary reduction gear, a large pulley for transmission belt, which is fixed to the ball screw shaft, and a transmission belt set around the small and large pulleys. Therefore, the whole shape of the power transmission mechanism can be made compact.

Also, the present invention provides a motor-driven injection driving apparatus for an injection molding machine, which is configured so that the rotation of an electric motor is converted into linear motion, and an injection screw is moved forward and rearward by the linear motion, comprising: a fixed frame provided with an injection cylinder in which the injection screw is fitted so as to be moved forward and rearward; first and second injection drive motors installed on the fixed frame; first and second ball screw shafts which are pivotally supported on both sides of the fixed frame so as to be in parallel and symmetrical with respect to the axis of the injection cylinder and so as to be rotatable, and are driven by the first and second injection drive motors, respectively; a movable frame capable of being moved in the direction of injection together with the injection screw; a screw drive motor, which is mounted on the movable frame, for rotatively driving the injection screw; first and second ball screw nuts threaded on ball threads of the first and second ball screw shafts, respectively; a pressure detecting sensor interposed between the movable frame and each of the ball screw shafts; and control means for providing feedback control of a screw back pressure, injection speed, and dwell pressure after injection so that the pressure detected by the pressure detecting sensor becomes a preset injection pressure.

Therefore, the first and second ball screw shafts carry a large injection force that has been distributed, and the distributed injection forces are detected by the pressure detecting sensors, so that a low-capacity pressure detecting sensor can be used.

Also, when the first and second ball screw shafts are turned fully synchronously, and the load is equally distributed to these ball screw shafts, the feedback control of pressure can be carried out by detecting only the load acting on one of the ball screw shafts. That is to say, the feedback control of pressure using only one pressure detecting sensor can be provided. If the feedback control using a single pressure detecting sensor is carried out, the cost can be reduced.

If a sensor of load cell type, in which a small displacement of a highly rigid cell body is measured by a strain gage, is used as the pressure detecting sensor, sufficient durability of the pressure detecting sensor can be maintained.

BEST MODE FOR CARRYING OUT THE INVENTION

Figure 1:
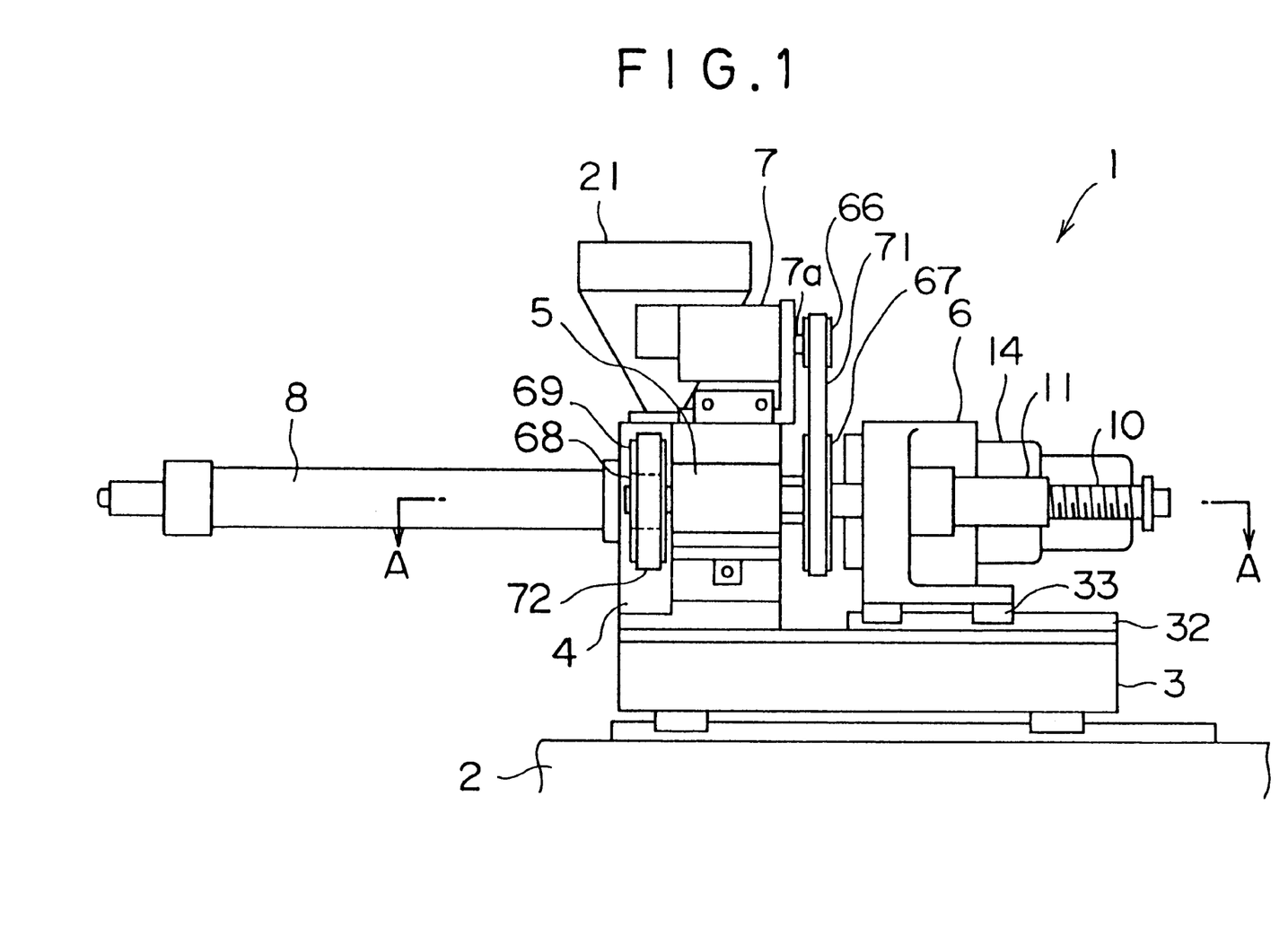
FIG. 1 is a side view of a motor-driven injection driving apparatus for an injection molding machine in accordance with a first embodiment of the present invention.
Figure 2:
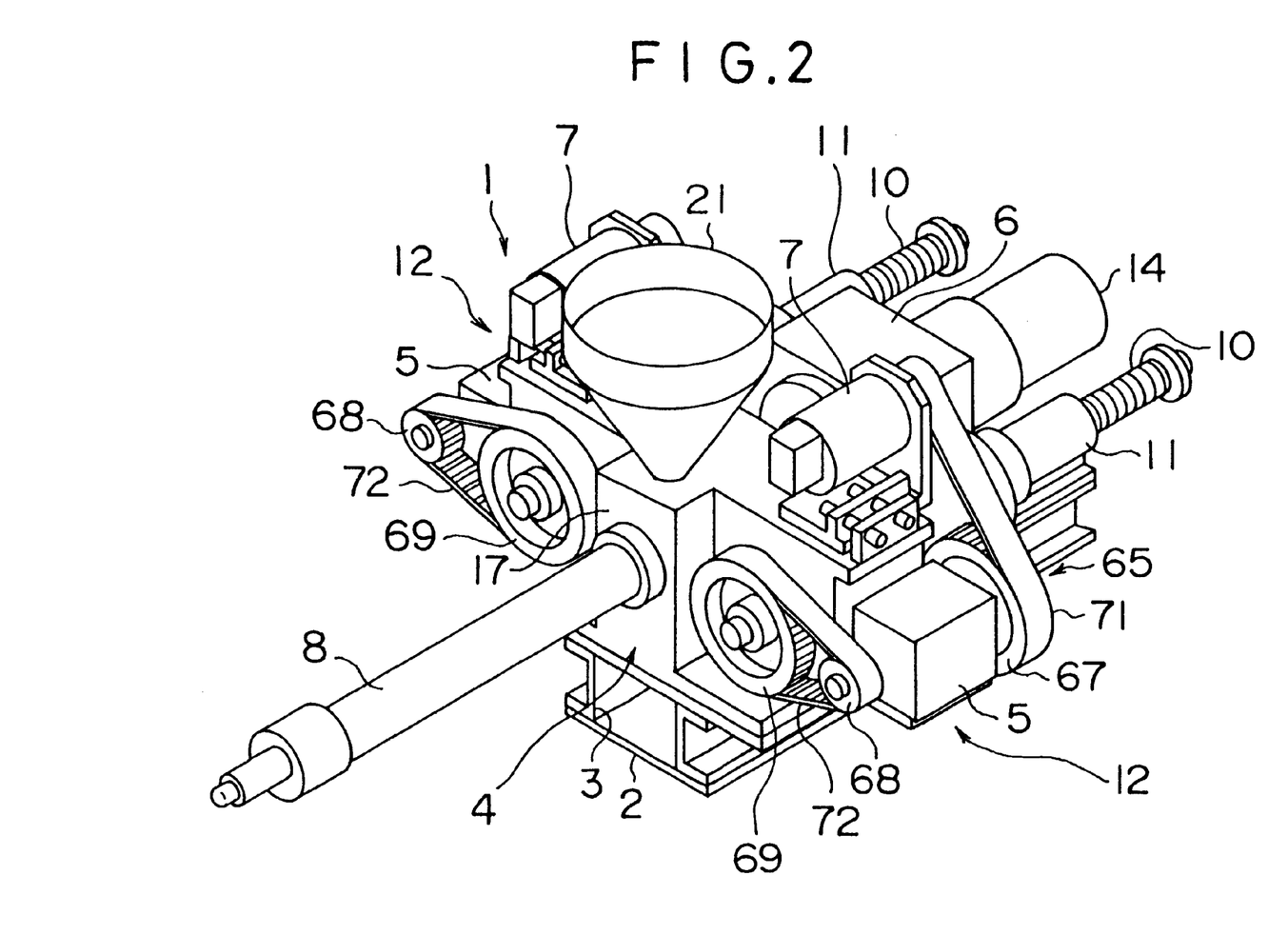
FIG. 2 is a perspective view of the motor-driven injection driving apparatus shown in FIG. 1.

Embodiments of the present invention will be described in detail with reference to the accompanying drawings. FIG. 1 is a side view of a motor-driven injection driving apparatus for an injection molding machine in accordance with a first embodiment of the present invention, and FIG. 2 is a perspective view of the motor-driven injection driving apparatus shown in FIG. 1.

A motor-driven injection driving apparatus 1 for an injection molding machine comprises a driving apparatus bed 3 installed on an injection molding machine base 2, a fixed frame 4 fixed to the driving apparatus bed 3, intermediate bearing frames 5 mounted to the fixed frame 4, and a movable frame 6 which moves so as to come close to and go away from the fixed frame 4.

Above the fixed frame 4 are provided a pair of injection drive motors 7, 7 with encoder. The motor 7, 7 has a take-up mechanism for adjusting the position movement in the transverse direction. On the front face of the fixed frame 4 is installed a proximal end portion of an injection cylinder 8. Also, on both sides of the fixed frame 4 are provided a pair of ball screw shafts 10, 10 pivotally supported so as to be in parallel and symmetrical with respect to the axis of the injection cylinder 8 and so as to be rotatable, and a pair of power transmission mechanisms 12, 12 for transmitting power to the ball screw shafts 10, 10 while reducing the speed.

Figure 3:
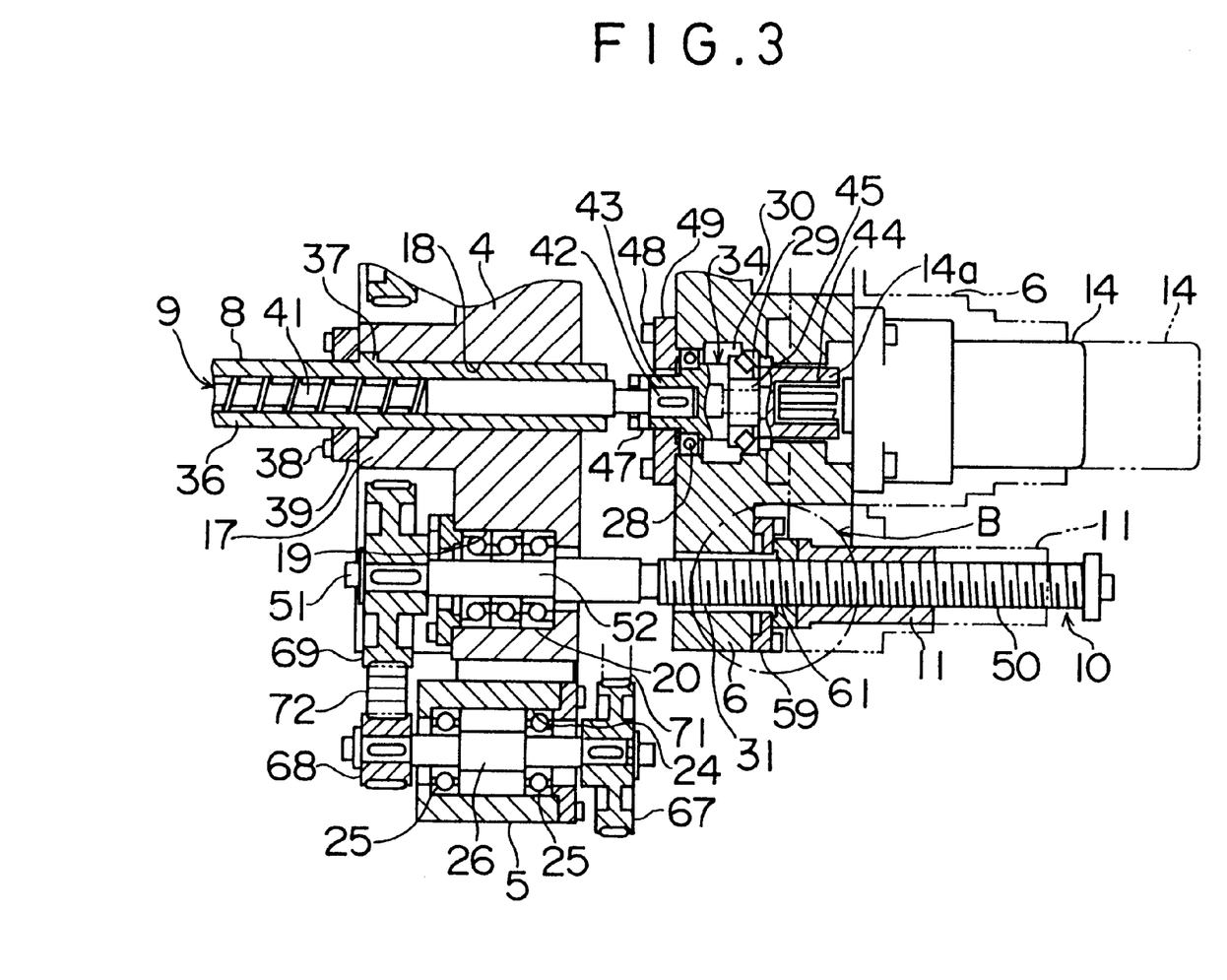
FIG. 3 is a plan sectional view taken along the line A—A of FIG. 1.

The movable frame 6 is provided with ball screw nuts 11, 11 threaded on ball external threads of the ball screw shafts 10, 10, and a screw drive motor 14 for rotatively driving an injection screw 9 (see FIG. 3).

The motor-driven injection driving apparatus 1 transfers and plasticizes a resin by driving the injection screw 9 by means of the screw drive motor 14. At the same time, the paired injection drive motors 7, 7 are operated synchronously by means of a controller, not shown, and the rotation thereof is converted into linear motion of the ball screw nuts 11, 11. Based on the above-mentioned two linear motions, the injection screw 9 is moved forward and rearward.

The fixed frame 4 has the intermediate bearing frames 5 arranged on both sides, a hopper 21 installed at the substantially central position on the top face to contain pellets of resin, which is a raw material for molding, and the injection drive motors 7, 7 arranged at the right and left on the top face. Also, as shown in FIG. 3, the fixed frame 4 is provided with a convex portion 17 at the central front in the transverse direction, a central hole 18 along the longitudinal direction, and bearing holes 19 at positions symmetrical with respect to the central hole 18. In the central hole 18, the proximal end portion of the injection cylinder 8 is fitted. In each of the right and left bearing holes 19 is provided an angular contact bearing 20 so that the ball screw shaft 10 is pivotally supported by the bearing 20 so as to be rotatable.

As shown in FIG. 3, the intermediate bearing frame 5 is formed with a central bearing hole 24 at the substantially central position, and rotatably supports an intermediate transmission shaft 26 via a ball bearing 25 provided in the central bearing hole 24. The intermediate bearing frame 5 having a take-up mechanism for adjusting the vertical movement is disposed at the side of the fixed frame 4.

Figure 4:
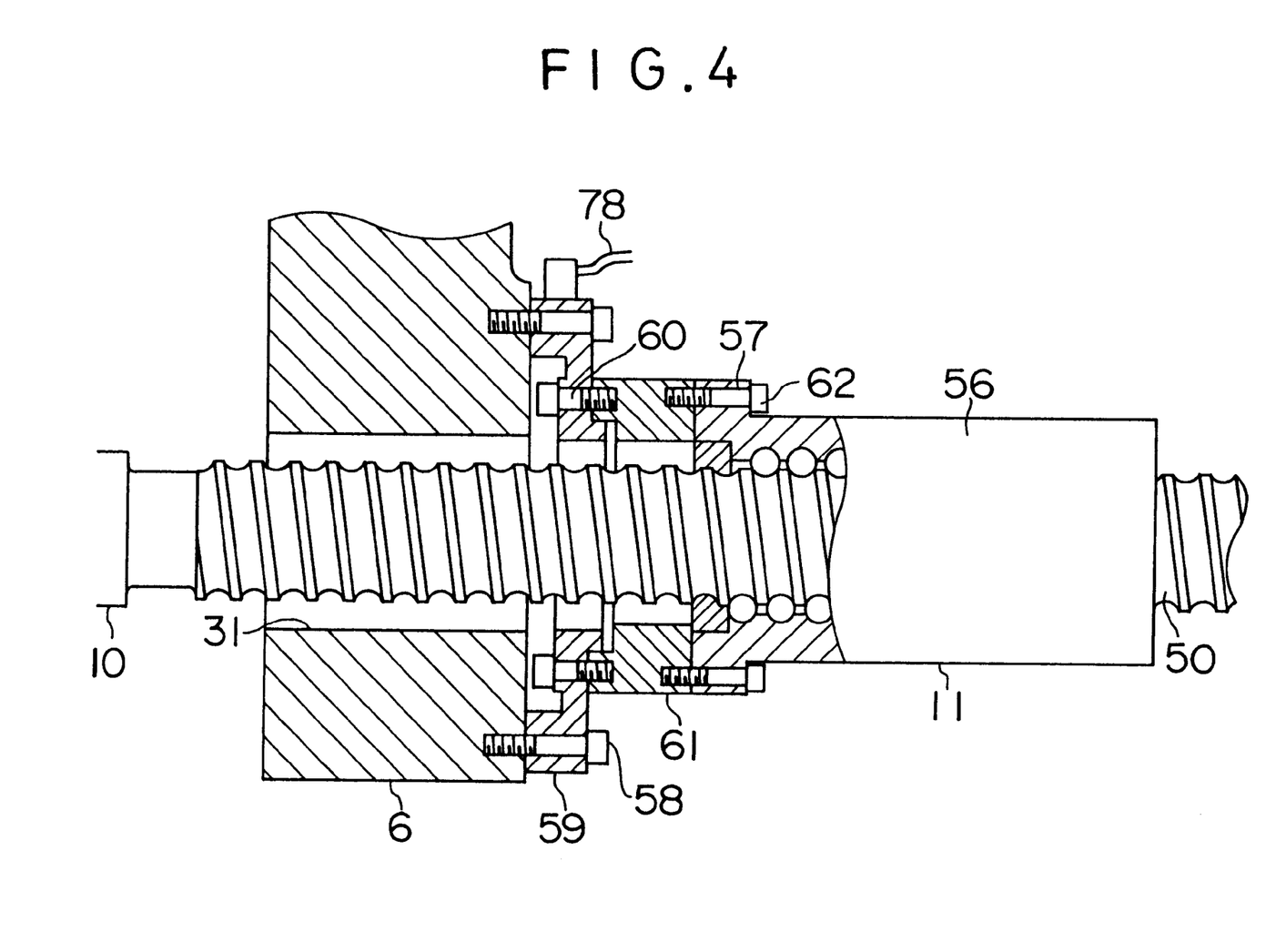
FIG. 4 is a partially enlarged plan view showing a portion indicated by the circle B of FIG. 3.

The movable frame 6 has a stepped central hole 30 shown in FIG. 3 formed concentrically with the central hole 18 in the fixed frame 4, and right and left through holes 31 (see FIG. 4). This frame is mounted horizontally via a linear bearing 33 on rails 32 laid in the longitudinal direction on the driving apparatus bed 3, so that it is capable of moving so as to come close to and go away from the fixed frame 4. In the central hole 30, there are provided a deep groove type ball bearing 28 for supporting a main shaft 34 and a tapered roller bearing 29 for carrying a great thrust of the main shaft 34.

On the rear face of the movable frame 6 is installed the screw drive motor 14 concentrically with the central hole 30. An output shaft 14a of the screw drive motor 14 is inserted in the central hole 30 to an intermediate position. Each of the injection drive motors 7 is disposed on the top face of the fixed frame 4, and a small pulley 66 for toothed belt, described later, is fixed to an output shaft 7a of the injection drive motor 7. The motor 7 has a take-up mechanism for the transverse movement. Each of the motors 7, 7 is individually provided with an encoder, and is operated synchronously based on an output signal from the encoder.

As shown in FIG. 3, the injection cylinder 8, having a cylinder body 36 passing through the central hole 18 of the fixed frame 4 and a flange 37 molded integrally with the cylinder body 36, is fixed to the front face of the frame 4 by means of bolts 38 so as to be prevented from coming off. In the injection cylinder 8 is fitted the injection screw 9 so as to move forward and rearward.

The injection screw 9, having a screw body 41 and a rear end shank 42, transmits the rotation of the output shaft 14a of the screw drive motor 14 via the main shaft 34 incorporated in the central hole 30 in the movable frame 6. The main shaft 34 has a front end cylindrical portion 43, a serrated rear end cylindrical portion 44, and a journal 45 interposed between the front and rear end portions, and the rear end cylindrical portion 44 is engaged with a serrated tip end portion of the output shaft 14a of the screw drive motor 14 by serrations so as to be rotated integrally.

Also, the main shaft 34 is prevented from coming off by a cover 49 installed to the movable frame 6 by screwing a plurality of bolts 48, and the shank 42 at the rear end of the injection screw 9 is fitted in the front end cylindrical portion 43. The rotation of the injection screw 9 is restrained by a key, and the axial movement thereof is restrained by a half nut 47.

As shown in FIGS. 3 and 4, the ball screw shaft 10 has a rear end ball external thread portion 50, a front end small-diameter portion 51, and a journal 52 interposed between the rear and front end portions. The ball external thread portion 50 passes through the through hole 31 in the movable frame 6 and is threadedly engaged with the ball screw nut 11.

The small-diameter portion 51 is provided with a large pulley 69 for toothed belt, described later. The journal 52 Is rotatably supported on the fixed frame 4 via the angular contact bearing 20.

When the paired ball screw shafts 10, 10 rotate synchronously, the ball screw nuts 11 on both sides move at the same time. As a result, the movable frame 6 moves forward or rearward in the axial direction of the Injection cylinder 8.

The ball screw nuts 11, each having a flange 57 at the front end portion of a nut body 56, are disposed on the movable frame 6 symmetrically with respect to the axis of the injection screw 9. Also, as shown in FIG. 4, the ball screw nut 11 is installed to the movable frame 6 via a pressure detecting sensor 59 (load cell) fixed to the movable frame 6 by a plurality of bolts 58, a spacer 61 fixed to the pressure detecting sensor 61 by a plurality of bolts 62.

The power transmission mechanism 12 is provided with a winding transmission portion 65. As shown in FIG. 2, the winding transmission portion 65 comprises the small pulley 66 installed to the output shaft 7a (see FIG. 1) of the injection drive motor 7, the intermediate transmission shaft 26 rotatably supported on the intermediate bearing frame 5, a large pulley 67 for toothed belt and a small pulley 68 for toothed belt installed at the rear and front ends of the intermediate transmission shaft 26, respectively, and the large pulley 69 installed to the ball screw shaft 10.

Also, the power transmission mechanism 12 has a first toothed belt 71 set around the small pulley 66 on the output shaft 7a and the large pulley 67 on the intermediate transmission shaft 26, and a second toothed belt 72 set around the small pulley 68 on the intermediate transmission shaft 26 and the large pulley 69 on the ball screw shaft 10, by which the rotational force of the injection drive motor 7 is transmitted to the ball screw shaft 10 via the belts 71 and 72 while the speed is changed at two stages. Each of the pulleys 66 to 69 is fixed to the corresponding shaft by means of an individual key.

The tension of the first toothed belt 71 can be adjusted by the take-up mechanism provided on the injection drive motor 7, and the tension of the second toothed belt 72 can be adjusted by the take-up mechanism provided on the intermediate bearing frame 5.

The pressure detecting sensor 59, which is connected to a controller, not shown, via a signal line 78, detects the injection pressure when the injection screw 9 moves in the direction of injection. When the rotations of the paired ball screw shafts 10 synchronize completely, the load is equally distributed to these ball screw shafts 10. In this case, the pressure detecting sensor 59 may be provided on either one of the paired ball screw shafts 10, and a dummy having the same shape manufactured of the same material as that of the pressure detecting sensor 59 may be provided on the other of the shafts 10. The injection pressure at this time is calculated as two times of the detected pressure of the pressure detecting sensor 59.

The following is a description of the operation of the motor-driven injection driving apparatus for an injection molding machine in accordance with the above-described first embodiment of the present invention. In the resin feed and plasticization process, the movable frame 6, the screw drive motor 14 installed to the movable frame 6, the ball screw nuts 11, and the like are located at positions indicated by the solid lines in FIG. 3.

In this process, the injection screw 9 is turned by the driving force of the screw drive motor 14, and resin pellets are fed from the hopper 21 into the injection cylinder 8. The resin pellets are heated and melted while being transferred forward by the screw 9, and are plasticized. At the same time, the injection drive motors 7, 7 are operated synchronously at a low speed. As a result, the movable frame 6 is moved rearward slowly together with the injection screw 9, so that the melted resin is accumulated at the distal end of the injection screw 9.

At this time, the low-speed synchronous rotation of the injection drive motor 7, 7 is transmitted to the intermediate transmission shaft 26 via the small pulley 66, the toothed belt 71, and the large pulley 67 on the intermediate transmission shaft 26, and further is transmitted from the intermediate transmission shaft 26 to the ball screw shaft 10 via the small pulley 68, the toothed belt 72, and the large pulley 69.

By the power transmission using these two sets of toothed belts 71 and 72, the rotational speed is reduced sufficiently, and the transmission torque is proportionally increased. Since all of the large and small pulleys 66 to 69 are used for the toothed belt, there is no slip in power transmission. Moreover, since the speed reduction ratio is fixed, the ball screw shafts 10, 10 are rotated synchronously.

When the injection screw 9 has finished the accumulation of resin for one shot for a mold, not shown, the movable frame 6 moves to a position indicated by the two-dot chain line in FIG. 3, and the screw drive motor 14 is stopped at this time.

Then, the paired injection drive motors 7, 7 are rotated synchronously at a high speed to move the injection screw 9 forward at a high speed. Thereby, the resin is injected into a cavity of the mold. At this time, the movable frame 6 returns to the position indicated by the solid line in FIG. 3. Thereafter, the process transfers to the resin feed and plasticization process for the next injection cycle, and the same processes as described above are repeated.

The following is a description of the detection of pressure applied to the ball screw shaft 10. In the injection process, the injection pressure at a resin storage portion located at the distal end of the injection screw 9 is transmitted to the ball screw shafts 10, 10 via the movable frame 6. Since the pressure detecting sensor 59 (load cell) is arranged so as to be held between the movable frame 6 and the ball screw nut 11 as shown in FIG. 4, the sensor 59 detects the driving force of the ball screw shaft 10, that is, the injection pressure. As described above, when the load is equally distributed to the paired ball screw shafts 10, 10, the pressure detecting sensor 59 may be provided only on either one of the paired ball screw shafts 10. In this case,, the injection pressure can be known by doubling the detection pressure of the sensor 59.

The not illustrated controller compares the output signal of the pressure detecting sensor 59 with a pressure command signal stored in advance, and regulates the rotational speed of each of the injection drive motors 7 so that the screw back pressure, injection speed, and dwell pressure after injection take values specified by the command signal. That is to say, the controller provides feedback control of the screw back pressure, injection speed, and dwell pressure after injection based on the detected pressures.

According to the injection driving apparatus in accordance with the above-described embodiment, since the apparatus has the injection drive motor 7 and the two-stage speed reduction power transmission mechanism 12 including the toothed belts 71 and 72 and the winding transmission portion 65 using the pulleys 66 to 69 for the belts, the output rotational speed of the injection drive motor 7 is increased, and thereby the output efficiency of the injection drive motor 7 can be enhanced. Also, since two sets of such driving systems are operated synchronously, the necessary driving force can be distributed to the driving systems. Therefore, even if a standard motor is used as the injection drive motor 7, a great rotational torque is transmitted to the ball screw shaft 10, and a sufficient injection pushing force can be generated on the ball screw shaft 10.

Also, since the apparatus is configured so that a tensile force acts on the ball screw shaft 10 in the injection process, even when a great injection force is required, there is no fear of deflecting the ball screw shaft 10. That is to say, unstable bending (buckling), which is liable to occur when the apparatus is configured so that a compressive force acts on the ball screw shaft 10, does not occur. Therefore, even if the rear end portion of the ball screw shaft 10 is not supported by a bearing, the ball screw shaft 10 can be operated in a stable state.

Although the return actuating force of the movable frame 6 acts on the ball screw shaft 10 as a compressive force, the actuating force at this time is far smaller than the actuating force at the time of injection. Therefore, there is no fear of unstable bending (buckling) occurring on the ball screw shaft 10.

As described above, according to the above-described injection driving apparatus, the injection drive motor 7 can be made smaller, and moreover the components of the two sets of driving systems are distributed symmetrically by using the lightweight belt transmission mechanism, the apparatus can be mounted on an injection molding machine with a good balance.

Further, when the load is equally distributed to the paired ball screw shafts 10, 10 provided symmetrically, the pressure detecting sensor 59 may be provided only on either one of the ball screw shafts 10, and the dummy of the same shape made of the same material may be provided on the other of the shafts 10, so that the expensive pressure detecting sensor 59 can be saved. Moreover, the equal distribution of the load decreases the detection capacity of the pressure detecting sensor 59 to a half of the actual injection pressure, so that the cost can be reduced in this respect as well. Also, since a sensor of load cell type, in which a small displacement of the body of a highly rigid structure is measured by a strain gage, is used as the pressure detecting sensor 59, sufficient durability can be maintained.

Figure 5:
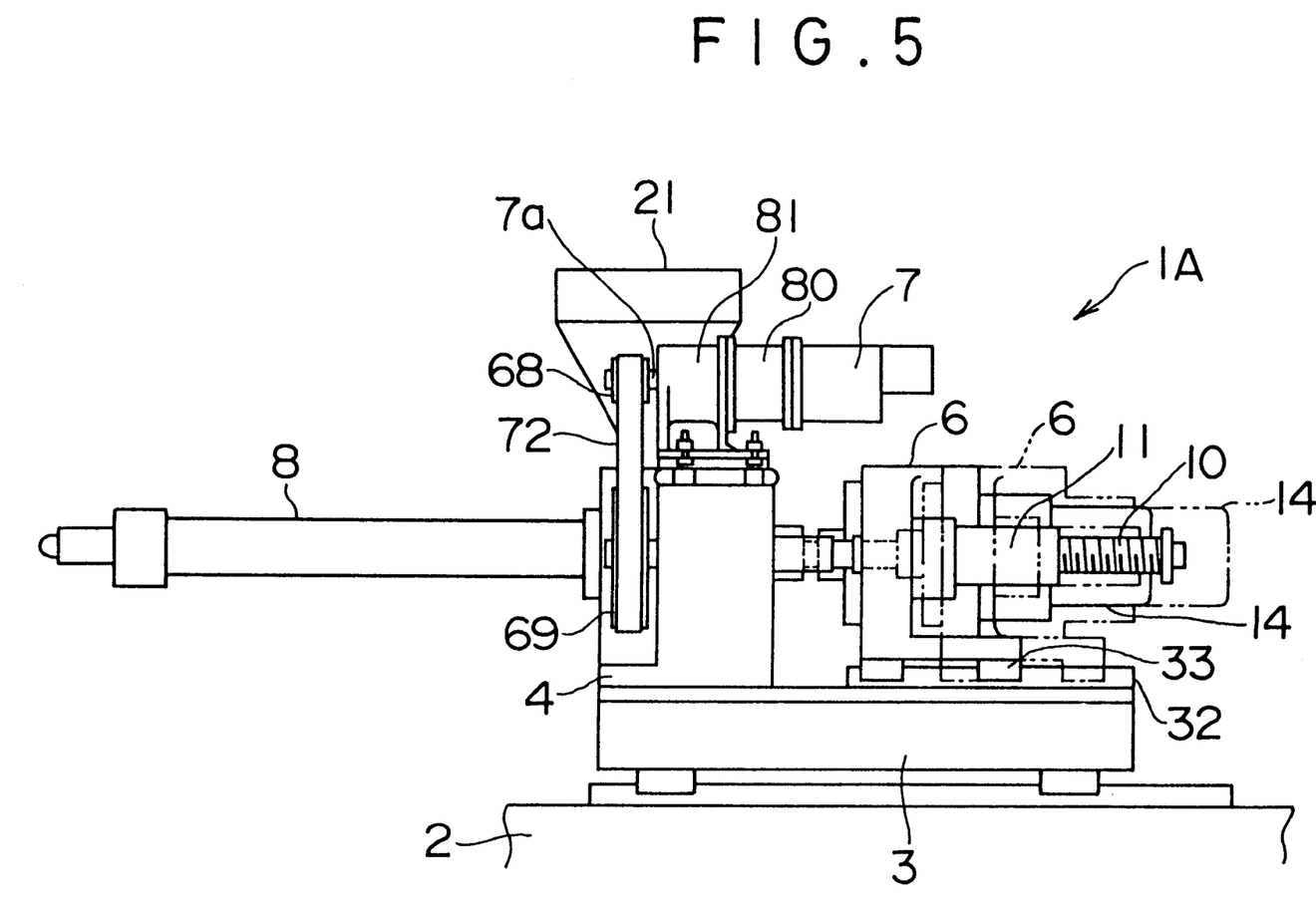
FIG. 5 is a side view showing the whole of a motor-driven injection driving apparatus for an injection molding machine in accordance with a second embodiment of the present invention.
Figure 6:
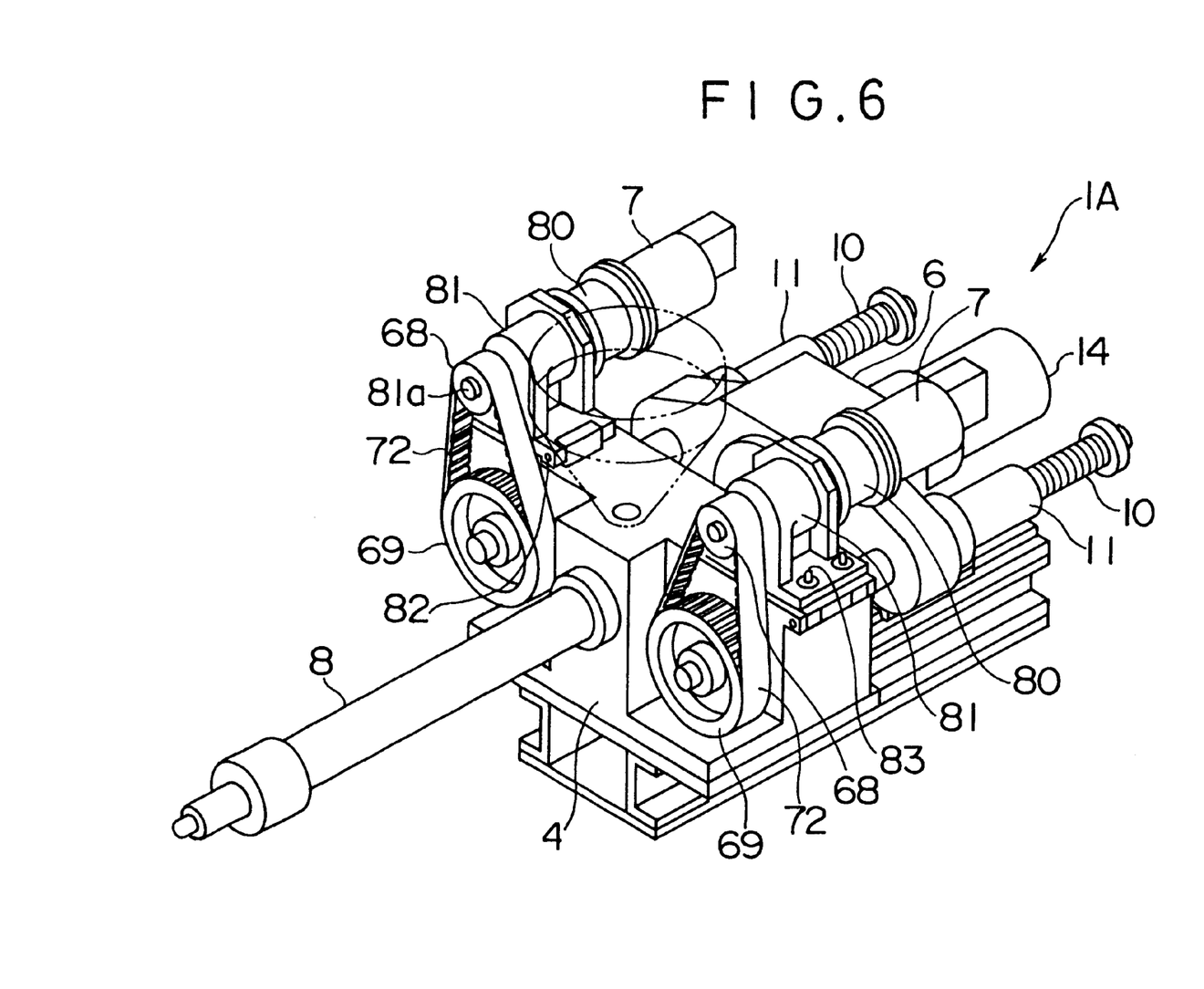
FIG. 6 is a perspective view of the motor-driven injection driving apparatus shown in FIG. 5.

FIG. 5 is a side view showing the whole of a motor-driven injection driving apparatus for an injection molding machine in accordance with a second embodiment of the present invention, and FIG. 6 is a perspective view of the motor-driven injection driving apparatus shown in FIG. 5. A motor-driven injection driving apparatus 1A is provided, on both sides on the top face of a fixed frame 4, with a pair of power transmission mechanisms each of which comprises a coupling housing 80, a planetary reduction gear 81 connected to the injection drive motor 7 via the coupling housing 80, a small pulley 68 for toothed belt fixed to an output shaft 81a of the planetary reduction gear 81, a large pulley 69 for toothed belt fixed to the ball screw shaft 10, and a toothed belt 72 which is set around the pulleys 68 and 69 to transmit power while reducing the speed, in place of the paired power transmission mechanism 12 in the first embodiment.

The planetary reduction gear 81 is provided with a take-up mechanism 83. This take-up mechanism 83 adjusts the tension of the toothed belt 72 by turning the reduction gear 81 in the vertical direction around a shaft 82 installed to the fixed frame 4. Other configurations are the same as those in the first embodiment, so that the same reference numerals are applied to the same elements, and the duplicated explanation of these elements is omitted.

For the motor-driven injection driving apparatus 1A in accordance with the second invention, since the planetary reduction gear 81 and the injection drive motor 7, which are connected integrally to each other, are mounted on the fixed frame 4, unlike the motor-driven injection driving apparatus 1 in accordance with the first embodiment, parts (intermediate bearing frames 5) do not project on both sides of the fixed frame 4. Therefore, the apparatus 1A has an advantage that the whole shape thereof can be made compact.

The position of the movable frame 6 indicated by the solid line in FIG. 5 is a position at which the injection process has finished and the next resin feed and plasticization process begins. Also, the position of the movable frame 6 indicated by the two-dot chain line in FIG. 5 is a position at which the resin for one shot for a mold has been accumulated at the distal end of the injection cylinder 8 and injection is going to begin. The operation of the motor-driven injection driving apparatus 1A of the second embodiment is exactly the same as that of the first embodiment if the speed reduction ratio is made equal, and therefore, the duplicated explanation thereof is omitted.

The present invention is not limited to the above-described embodiments, and various changes and modifications can be made. For example, in place of the toothed belts 71 and 72 and the toothed pulleys 66 to 69 around which the belts are set of the winding transmission portion 65 shown in FIG. 2, chains and chain wheels can be used. Also, in place of the power transmission mechanism provided with the two-stage speed reducing means, a power transmission mechanism provided with one-stage speed reducing means with a high speed reduction ratio can also be used.

INDUSTRIAL APPLICABILITY

The motor-driven injection driving apparatus for an injection molding machine in accordance with the present invention is useful for achieving a small cost and low cost of the driving portion, and also for enhancing the arrangement balance of the injection molding machine.

What is claimed is:

1. A motor-driven injection driving apparatus for an injection molding machine, which is configured so that the rotation of an electric motor is converted into linear motion, and an injection screw is moved forward and rearward by said linear motion, comprising:

a fixed frame provided with an injection cylinder in which said injection screw is fitted so as to be moved forward and rearward;

a movable frame which is provided so as to be moved forward and rearward in the axial direction of the injection cylinder and which is moved to said fixed frame side together with said screw upon the injection process;

first and second injection drive motors installed on said fixed frame;

first and second ball screw shafts pivotally supported on both sides of said fixed frame so as to be in parallel and symmetrical with respect to the axis of said injection cylinder and so as to be rotatable, said first and second ball screw shafts extending from said fixed frame to said movable frame;

first and second power transmission mechanisms for transmitting the rotational forces of said first and second injection driving motors to said first and second ball screw shafts, respectively, while reducing the speed;

first and second ball screw nuts, which are provided on both sides of said movable frame and threaded on ball threads of said first and second ball screw shafts, respectively;

a screw drive motor, which is mounted on said movable frame, for rotatively driving said injection screw; and a controller for synchronously rotating said first and second injection drive motors, said movable frame being moved by rotation of said first and second ball screw.

2. The motor-driven injection driving apparatus for an injection molding machine according to claim 1, wherein first and second intermediate bearing frames are provided on one side and on other side of said fixed frame, and said power transmission mechanism includes an intermediate transmission shaft pivotally supported on said intermediate bearing frame so as to be rotatable and winding transmission means for transmitting power from said injection drive motor to said ball screw shaft through said intermediate transmission shaft while reducing the speed.

3. The motor-driven injection driving apparatus for an injection molding machine according to claim 1, wherein said power transmission mechanism includes a planetary reduction gear connected directly to said injection drive motor, a first pulley fixed to an output shaft of said planetary reduction gear, a second pulley fixed to said ball screw shaft, and a transmission belt set around said first and second pulleys.

4. A motor-driven injection driving apparatus for an injection molding machine, which is configured so that the rotation of an electric motor is converted into linear motion, and an injection screw is moved forward and rearward by said linear motion, comprising:

a fixed frame provided with an injection cylinder in which said injection screw is fitted so as to be moved forward and rearward;

first and second injection drive motors installed on said fixed frame;

first and second ball screw shafts which are pivotally supported on both sides of said fixed frame so as to be in parallel and symmetrical with respect to the axis of said injection cylinder and so as to be rotatable, and are driven by said first and second injection drive motors, respectively;

a movable frame capable of being moved in the direction of injection together with said injection screw;

a screw drive motor, which is mounted on said movable frame, for rotatively driving said injection screw;

first and second ball screw nuts threaded on ball threads of said first and second ball screw shafts, respectively;

a pressure detecting sensor interposed between said movable frame and each of said ball screw shafts; and control means for providing feedback control of a screw back pressure, injection speed, and dwell pressure after injection so that the pressure detected by said pressure detecting sensor becomes a preset injection pressure.

5. A motor-driven injection driving apparatus for an injection molding machine, which is configured so that the rotation of an electric motor is converted into linear motion, and an injection screw is moved forward and rearward by said linear motion, comprising:

a fixed frame provided with an injection cylinder in which said injection screw is fitted so as to be moved forward and rearward;

first and second injection drive motors installed on said fixed frame;

first and second ball screw shafts pivotally supported on both sides of said fixed frame so as to be in parallel and symmetrical with respect to the axis of said injection cylinder and so as to be rotatable;

first and second intermediate bearing frames, provided on one side and another side of said fixed frame;

first and second power transmission mechanisms for transmitting the rotational forces of said first and second injection driving motors to said first and second ball screw shafts, respectively, while reducing the speed, each of said power transmission mechanism including an intermediate transmission shaft pivotally supported on said intermediate bearing frame so as to be rotatable and winding transmission means for transmitting power from said injection drive motor to said ball screw shaft through said intermediate transmission shaft while reducing the speed;

a movable frame which is provided, on both sides, with first and second ball screw nuts threaded on ball threads of said first and second ball screw shafts, respectively, and is capable of being moved in the direction of injection together with said injection screw;

a screw drive motor, which is mounted on said movable frame, for rotatively driving said injection screw; and a controller for synchronously rotating said first and second injection drive motors, said movable frame being moved so that a tensile force acts on said first and second ball screw shafts in an injection process.

* * * * *

UNITED STATES PATENT AND TRADEMARK OFFICE
CERTIFICATE OF CORRECTION

PATENT NO. : 6,386,853 B1
DATED : May 14, 2002
INVENTOR(S) : Mizuno et al.

It is certified that error appears in the above-identified patent and that said Letters Patent is hereby corrected as shown below:

<u>Title page,</u>
Item [56], References Cited, FOREIGN PATENT DOCUMENTS, insert:
-- WO          WO90/14206   11/1990
   JP           09300410A    11/1997 --.

Signed and Sealed this

Twenty-second Day of October, 2002

*Attest:*

*Attesting Officer*

JAMES E. ROGAN
*Director of the United States Patent and Trademark Office*